United States Patent [19]

vom Braucke et al.

[11] Patent Number: 4,613,272

[45] Date of Patent: Sep. 23, 1986

[54] METHOD OF OPERATION FOR LOADING A MOTORIZED FLOOR TRUCK AND SUPPORT CARRIAGE THEREFOR

[75] Inventors: Manfred vom Braucke, Bielefeld; Hans vom Braucke jun, Vlotho, both of Fed. Rep. of Germany

[73] Assignee: Bielefelder Kuchenmaschinen-und Transportgeratefabrik GmbH, Bielefeld, Fed. Rep. of Germany

[21] Appl. No.: 697,245

[22] Filed: Feb. 1, 1985

[30] Foreign Application Priority Data

Feb. 2, 1984 [DE] Fed. Rep. of Germany ....... 3403585

[51] Int. Cl.[4] .............................................. B65G 67/00

[52] U.S. Cl. .................................... 414/347; 414/467; 414/786

[58] Field of Search ............... 414/347, 467, 495, 498, 414/592, 607, 608, 786, 787

[56] References Cited

U.S. PATENT DOCUMENTS

| | | | |
|---|---|---|---|
| 2,904,201 | 9/1959 | Rhodes | 414/467 |
| 3,199,692 | 8/1965 | Lebre | 414/607 X |
| 3,710,965 | 1/1973 | Joosten | 414/467 |
| 4,049,083 | 9/1977 | Garvey | 414/607 X |
| 4,061,237 | 12/1977 | Austin et al. | 414/467 |
| 4,180,363 | 12/1979 | Steiger et al. | 414/498 X |
| 4,266,795 | 5/1981 | Walker | 414/467 X |
| 4,396,341 | 8/1983 | Brouwer et al. | 414/467 |
| 4,435,113 | 3/1984 | Mosley et al. | 414/347 |
| 4,460,064 | 7/1984 | Lutz et al. | 414/467 |

FOREIGN PATENT DOCUMENTS 2530634 1/1977 Fed. Rep. of Germany .

*Primary Examiner*—Joseph E. Valenza
*Assistant Examiner*—David A. Bucci
*Attorney, Agent, or Firm*—Burns, Doane, Swecker & Mathis

[57] ABSTRACT

A motorized floor truck is operable to place a load on an elevated surface and to elevate itself to that elevated surface. The truck includes a lifting assembly and a supporting assembly. The lifting assembly has a load engaging device which is vertically movable. The supporting assembly has a device engageable with the load engaging device in a vertical position. With the engaging device engaged, lowering of the load engaging device raises the lifting assembly to the elevated surface. With the lifting device on the elevated surface, raising the load engaging device lifts the supporting assembly to the elevated surface.

33 Claims, 29 Drawing Figures

METHOD OF OPERATION FOR LOADING A MOTORIZED FLOOR TRUCK AND SUPPORT CARRIAGE THEREFOR

BACKGROUND OF THE INVENTION

The invention relates to a method for handling a motorized floor truck, the truck comprised of a lifting carriage and a support carriage, wherewith the lifting carriage includes load accommodation means which are raisable and lowerable, further said lifting and support carriages are operable as vehicles mutually independently, wherewith by operating said carriages cooperatively one can effect alternate supporting and raising of said elements of said floor truck to a deposit level which is higher than the floor level, and wherewith carriage members of said carriages can be driven into positions underneath at least the end region of receiving surfaces on said deposit level. The invention further relates to a motorized floor truck comprised of a lifting carriage and a support carriage, for carrying out the method of alternate supporting and raising.

The problem of raising a motorized floor truck to levels above that of floor level is a frequently encountered one, which is of particular significance when goods are being transported on a highway truck and no appropriate motorized floor trucks are available at the unloading or loading sites. In order to be able to unload the highway truck with its loading surface disposed above floor level, a lift truck or the like is needed, and this is generally unavailable at the unloading site. From this standpoint, so-called "carry-along" system have been developed wherein a lifting carriage with a dual-action lifting cylinder is attached to the highway truck. In very simple embodiments of this, the lifting carriage with raised load-accommodation means runs under the rear end of the chassis of the highway truck, and the load-accommodation means engages a receiving mechanism in or on the highway truck and may be attached thereto. Then, by a subsequent "lowering of the load-accommodation means", the lower part of the lifting carriage is raised up and comes into contact (from underneath) with the structure of the highway truck. With such a system, clearly one must provide special devices which are suitable for attaching the motorized floor truck which is now linked to the highway truck and transportable by same.

German OS No. 25 30 634 discloses a motorized floor truck comprised of a lifting carriage with a dual-action cylinder by which cylinder the load-accommodation means can be raised and lowered, and for which truck a support or bracing device is provided. In order to transport the lifting carriage on a highway truck, the lifting carriage is moved to the rear end of the highway truck with its load-accommodation means raised, and the forward end of the load accommodation mean is lowered to the loading level of the highway truck. After affixing supports or lowering previously affixed supports, the undercarriage of the lifting carriage can then be raised to the level of the highway truck with the aid of the just-engaged load accommodation means. In connection with this reference there are two embodiments: In the first embodiment, the support is provided by the horizontal piece, e.g., a platform or crossbar which accommodates the load accommodation means and in which the load accommodation means can be moved back and forth. In the second embodiment, the support is provided by rollers. In both cases, once the lifting carriage is raised up to the highway truck, it can be slid either (a) on the crosspieces of the supports or (b) along with the rollable supports on the loading level of the highway truck. Subsequently, the supports may be removed, retracted, swung up, or the like. The highway truck can then be driven to the next loading or unloading site with the lifting carriage loaded on its (the highway truck's) load surface, and with the supports. With the general technique described above for raising the lifting carriage, there is the inconvenience that the support device or parts thereof must be raised manually.

OBJECTS AND SUMMARY OF THE INVENTION

Based on the preceding, an object of the invention is a method which avoids the above-described disadvantages and according to which a motorized floor truck can be raised onto a highway truck and be unloaded from said highway truck without the need for additional auxiliary mechanisms on the highway truck. It is a further object of the invention to provide a motorized floor truck by means of which the inventive method can be carried out.

The foregoing, as well as many other objects are achieved according to the invention described in the claims. In accord with the method of this invention, a lifting carriage, when coupled to a support carriage, can be driven either via a drive wheel of the support carriage (in a state where a load accommodation means of the lifting carriage is lowered and thereby the lifting carriage is raised) or via drive wheels of the lifting carriage itself (in a state where the said load accommodation means are raised and thereby the support carriage is raised). When the load accommodation mean of the lifting carriage is lowered, the lifting carriage is thereby raised. In this manner, the entire load is transmitted to the underlying surface via the support carriage.

The support carriage is manipulated so that the raised lifting carriage can be deposited on the higher-level surface, e.g., the bed of a highway truck by raising the load accommodation means of the lifting carriage, then this deposit is carried out, then the support carriage is raised onto the higher-level surface. Unobstructed raising of the support carriage is interfered with by the fact that the lower frame of the support carriage has been driven to a position below the surface onto which the support carriage is to be deposited. The lower frame is moved out of the interference position by, e.g., swinging it around or otherwise away or shifting it translationally, then after it is raised above the deposit surface it is restored to its normal disposition on the support carriage. Next, the support carriage is deposited on the deposit surface where the lifting carriage has already been deposited, by lowering the load accommodation means of the lifting carriage. Then the combination of lifting carriage and support carriage is pushed to the desired position on the higher-level surface. This sequence is achieved by a coupling means, whereby the forward ends of the load accommodation means of the lifting carriage can be interlocked with a vertical column-frame of the support carriage (at least for lifting actions) by a force mechanism wherein the principal force is gravity.

If the lifting carriage is self-propelled, it is advantageous for this self-propelling mechanism to be employed for propelling the combination of the lifting carriage and support carriage along the underlying surface. This applies both to driving the said combination to the site of the raising and for driving it after it is deposited on the elevated surface, since it is the lifting carriage (if it is self-propelling) with its drive wheels which is first deposited on the elevated level.

It is clear that the sequence of operations can be performed in reverse, for the purpose of transferring the said combination from the elevated level to a lower or floor level.

In the device according to the invention, the forked undercarriage of the support carriage enables two carriages (a lifting carriage and a support carriage) to be slid together interpenetratingly, in a mutually facing orientation. The means required for coupling is furnished on the support carriage. At least the ends of the load accommodation means of the lifting carriage can be inserted into said coupling means. After the support carriage has been raised, the load accommodation means of the lifting carriage can be lowered to effect a clamping or coupling by gravity force. Accordingly, the load accommodation means is provided at a suitable height, whereby the support carriage can be lifted to a position at least slightly higher than the deposit surface. In that position the load accommodation means of the lifting carriage is correspondingly at its lowest position, The minimum highest position of the load accommodation means of the lifting carriage is reached when the entire support carriage is lifted to a position slightly higher than the deposit surface.

In a refinement of the invention, sockets or sleeves may be provided on the column-frame of the support carriage in the region of the lower ends of the vertical beams or in the region of the first or lowest crossbeam. Longitudinal beams of the undercarriage of the support carriage are slidably held in those sockets. The cross sectional shape and surface of each of these sockets (or sleeves) correspond to the external form of the corresponding longitudinal beam. Each socket accommodates each corresponding longitudinal beam with a tolerance that enables locking by various means which may be applied.

Further, to assist in such locking, the end of each longitudinal beam which is associated with the socket is provided with an end detent, preferably in the form of an end plate. In addition, it is proposed that the sockets for slidably receiving corresponding longitudinal beams of the undercarriage of the support carriage can be provided with detents to limit the sliding excursion of he longitudinal beams. These detents are preferably in the form of stop dogs which engage the edge of the respective socket. The height of the stop dog is selected such that the longitudinal beam tips within the socket when the longitudinal beam becomes free of load as the support carrige is lifted as a consequence of the tolerance between the longitudinal beam and the socket. Due to such tipping, the stop dogs are positioned so as to be unblocked under the edge of the socket. It is further proposed that the detent means for blocking the slidability of the longitudinal beams be provided in the form of spring-loaded stopping-catches which engage recesses in the longitudinal beams and which may be lifted out of said recesses by means of hand- or foot-actuated levers.

A roller may be provided in the interior of each socket near the inner wall of the upper member and in the region of the socket in which the longitudinal beam swings toward the lower member of the socket when the longitudinal beam is released from its load. Also the longitudinal beam may have a T-shaped or I-shaped cross section with projecting chords on at least its upper side. This configuration makes it possible to drive underneath the higher-level surface which may be, for example, the bed of a highway truck, during the raising and lifting procedure. After slightly raising the support carriage by raising the load accommodation means of the lifting carriage and thereby removing the load from the longitudinal beams of the support carriage, this configuration makes it possible to move or slide the longitudinal beams in such a way as to be able to lift them above the deposit level on the elevated surface.

In order to prevent spurious sliding of the longitudinal beams in the loaded state, a detent means is provided which may be in the form of stop dogs or stopping catches. The stop dogs act only when the longitudinal beams are in the loaded state. Under load, the longitudinal beams are disposed ahead of the upper member of the socket, or ahead of a support bearing on the upper member of the socket. The stopping catches, if present, are active (by engaging openings in the longitudinal beams) in either the loaded or the unloaded state of the longitudinal beams.

For improved stabilization, it is advantageous to provide two support bearings which are mutually diagonally disposed in the socket. These support bearings support a given longitudinal beam in both the upper and lower regions when the longitudinal beam is in the loaded state. Rod pieces may also be provided, corresponding to and disposed opposite to the support bearings. In use, the longitudinal beam rests against the rod pieces after it is freed of its load, whereby it can be readily slid, particularly if the rod pieces are rotatably mounted (i.e., in the form of rollers). When stopping catches are used as detent means, the detent action continues when the longitudinal beams are in the unloaded state, and must be released by hand or foot action by the operator. Obviously, remotely operable means, such a hydraulic cylinders, reciprocating-element solenoids, etc., may also be employed for this detent releasing purpose.

For improved slidability of the longitudinal beam in the socket, the longitudinal beam may be given a T-shaped cross section, with projecting chords or flanges being present at least on the upper side of the longitudinal beam. Rollers are mounted in the interior of the socket, with trunnions affixed to the socket. These rollers engage the undersides of the said projecting flanges, so that the flanges ride on said rollers when the longitudinal beam slides longitudinally. For improved stability, the longitudinal beam may have an I-beam shape, with the lower side of the longitudinal beam being provided with projecting flanges corresponding to those on the upper side of the longitudinal beam.

In a particularly advantageous embodiment, the wheels or roller are affixed to the free ends of the longitudinal beam of the support carriage by means of caster-type arms which are bent backward. When the longitudinal beams slide into the sockets or sleeves, the rollers or wheels are moved to a position underneath the vertical beams, and thus require less space on the load surface of the highway truck.

As an alternative to sliding the longitudinal beams it is proposed that the longitudinal beams of the undercarriage of the support carriage be made swingable around a horizontal axis. In this manner, after the support carriage has been relieved of load by being lifted by the lifting carriage, these longitudinal beams can be swung into a vertical position. In that vertical position, the beams will lie next to the vertical beams and will not interfere with further lifting of the support carriage.

It is further proposed that the means for engaging the load accommodation means of the lifting carriage with the support carriage be in the form of a shoe, with the cross sectional shape of the shoe corresponding to that of the load accommodation means. The shoe accepts the forward end of the load accommodation means in approximately form-locking fashion. It is also proposed that the shoe be provided with screw-type clamping means for securing the forward end of the load accommodation means of the lifting carriage, which forward end is inserted in said shoe on the column-frame of the support carriage. Further, it is proposed that the shoe on the column-frame of the support carriage be symmetrical in the direction of introduction of the load accommodation means of the lifting carriage. Thus, the load accommodation means of the lifting carriage will be introducible into the shoe from either side.

In addition, it is proposed that the means for engaging the load accommodation means of the lifting carriage with the support carriage (preferably with the shoe on the support carriage) have a tripping finger, and that the longitudinal beams of the lifting carriage each be provided with a locking device which on the occasion of the raising of the lifting carriage is actuatable by interaction with the tripping finger and which upon redeposit of the lifting carriage prevents movement of the lifting carriage, at least in the forward direction, i.e. preferably in the forward driving direction of the lifting carriage. This is an important feature if, due to an incline in the load surface of the highway truck, there is a danger that the lifting carriage may roll away from the insertion direction, i.e., the direction of insertion of the load accommodation means of the lifting carriage into the sockets of the support carriage. By virtue of the described means of introduction of the load accommodation means, one has the option of a simple plug configuration, which is sufficiently secure and reliable to accommodate the changing load states.

To facilitate the insertion, a visor-like projection may be provided. In its simplest embodiment, the projection may be in the form of an extension of the upper member of the said shoe in the direction opposite to the said insertion direction. Tolerances which may become troublesome during the lifting operation can be eliminated by screw clamping means. With the proposed symmetrical shoe, the load accommodation means can be introduced from either side. Since the width of the chassis of the lifting carriage is chosen such that the support carriage can be pushed between the carriage claw beams of said chassis, the inverted insertion direction (as defined above) offers advantages for a number of transport problems. When the lifting carriage is placed on the elevated support surface, it is desirable to prevent its movement in a direction of travel (e.g., when the lifting carriage is deposited onto the load surface of a highway truck, it is desirable to prevent its movement in the direction opposite to the forward travel direction of the lifting carriage and the highway truck). Therefore, it is advantageous for a locking means to be provided in at least one of the carriage beams of the lifting carriage. These locking means are advantageously in the form of simple inclined brake levers. When the lifting carriage is in the raised position, the carriage beams of the lifting carriage are in the immediate neighborhood of the shoes. Thus, the brake levers are advantageously actuated by a tripping finger provided on the shoe.

Further, it is proposed that the wheel(s) or roller(s) in the region of the forked base and mounted on the lowest crossbeam of the column-frame of the support carriage be steerable. In this connection it is advantageous if the steerable wheel(s) or roller(s) are centrally disposed with respect to the lowest crossbeam of the column-frame of the support carriage and are centrally connected to said crossbeam by means of a caster arm (i.e., a backward-extending arm). As an alternate the steerable wheel(s) or roller(s) could be in the form of individual rollers connected to the crossbeam such that they are disposed symmetrically in the lateral direction with respect to a center plane, and separated at a distance from each other. It is further proposed that a steering bar, which can be swung up, be connected to the middle trunnion of the steerable wheel or the steerable set of wheels or rollers, or to the said crossbeam. In addition a support member for clampwise accommodation of the steering bar when said bar is swung up is attached to another (a third) crossbeam of the column-frame of the support carriage. This configuration enables the support carriage to be easily maneuvered, even under load (e.g., when it is carrying the lifting carriage).

The steerable wheels or rollers may alternatively be disposed non-centrally. In a customary fashion, a tie rod with steering-knuckle-type connections to the wheels or rollers can be provided, having a common steering saddle in the middle.

A simpler steering system is also possible, employing single-axle, caster-type steering. The steered wheels or rollers may be disposed as a narrowly arrayed pair with a single common caster arm or may be disposed at a distance apart with each wheel or roller having its own caster arm and trunnion. The steering bar (which also serves as a wagon tongue) operates, in the case of active steering, on the steering saddle or directly on the wheel or roller set. In the case of passive steeing, e.g. by means of a set of caster rollers, the steering bar operates solely as a wagon tongue.

It is further proposed that the lifting carriage be in the form of a forked lift truck supported by separated supporting beams disposed underneath the load accommodation means, but with the load accommodation means extending forward a predetermined distance beyond the supporting beams. The predetermined distance is at least equal to the diameter of the rollers (or wheels) plus the cross sectional width of the vertical beams of the column-frame of the support carriage. In contrast to certain relatively tilt-stable counterweight-type fork trucks, here the supporting (claw) beams fully assume a part of the load borne by the load accommodation means.

The length relation ensures that the load accommodation means of the lifting carriage can be guided properly into the structure on the support carriage intended for receiving said load accommodation means, without having the supporting beams come into the region of the wheel or roller sets on the forked base of the support carriage. It also ensures that that the load accommodation means of the lifting carriage will extend beyond the rear end of the deposit surface when the lifting carriage is set down on said surface, whereby when next the support carriage is lifted to the elevated deposit level after its longitudinal beams are slid or swung out of the way, the support carriage will be able to be moved past the rear end of said surface without contact.

It is further proposed that the height of the upper edge of the longitudinal beams of the undercarriage of the support carriage be at maximum equal to the lifting height of a low-lift truck (which is itself a known device). In this way the support carriage may do double duty. The longitudinal beams may receive loads (particularly palletized loads) deposited onto said beams from the lifting carriage, and these loads may be subsequently retrieved from said longitudinal beams.

It is further proposed that in addition to the end-disposed rollers on the supporting beams (i.e., carriage or claw beams) of the lifting carriage, supporting rollers be provided at a distance from said rollers and said beam ends. The supporting rollers clear the floor by a small distance when the end-disposed rollers and other main rollers of the lifting carriage are resting on the floor (or other underlying surface). Further, it is proposed that these supplementary supporting rollers be provided with locking means. These supporting rollers can be used to support the lifting carriage on the load surface of the highway truck when the lifting carriage is being loaded onto said surface but has been only partially introduced into the load space of the highway truck. In this position of the lifting carriage, its load accommodation means extends beyond the rear end of the highway truck, thereby facilitating the lifting of the support carriage. When traveling on a level surface, the lifting carriage is supported by its end-disposed rollers. The supplementary rollers disposed at a short clearing distance from said underlying surface do not contact said surface and do not interfere with the travel. The locking means for the supporting rollers enables one to fix them in place when the latter has been deposited with an overhang on the rear end of the load surface of the highway truck.

In addition it is proposed that the load accommodation means of the lifting carriage be in the form of preferably two forwardly directed and forwardly telescopically extensible profiles. This extensibility enables the lifting carriage to be used to transport goods of greater length.

It is further proposed that the profiles of the longitudinal beams of the undercarriage of the support carriage comprise laterally and upwardly projecting flange-like members on their exterior edges. These flange-like members are preferably provided in the regions of the rear and front ends of said lonitudinal beams. These flange-like members also serve to securely hold loads deposited on the longitudinal beams, particularly palletized loads. Advantageously the dimensions of said members and their positioning are based on those of the normally handled (or standardized) pallets. In view of the slidability feature of the longitudinal beams, it is advantageous if the end surfaces of the said upwardly projecting members cooperate with, i.e , are compatible with the sliding engagement of the longitudinal beam assembly with the upper member of the socket or sleeve on the column-frame of the support carriage, in the manner of a stop dog. The height of the projecting members is chosen such that the overall height of the assembly comprised of the longitudinal beams and the upwardly projecting member is, at maximum equal to the interior vertical free span of the socket or sleeve on the column-frame. Further it is proposed that the upwardly projecting members be oriented at an angle which is laterally widening, i.e., extending outwardly and upwardly. This configuration enables goods, particularly palletized goods, to be positioned with the said projections advantageously disposed to correspond to the dimensions of the pallets used (or of standard pallets). The projections are preferably set at an outwardly opening angle to facilitate the precise positioning of said pallets when such pallets are deposited on the longitudinal beams.

In a preferred embodiment, the elevation of the longitudinal beams of the undercarriage of the support carriage is adjustable, preferably by hand-pumped hydraulic means such as typically provided with fork trucks. When the lonitudinal beams are given this added feature, good use can be made of the support carriage as an independent low-lift lift truck. Obviously, in such a case the individual longitudinal beam will be comprised of a beam provided with a carriage or drive roller and with a lifting rail and with a lifting member provided between the said beam and said rail. The lifting member can be raised and its elevation with respect to the beam carriage or claw beam can be adjusted to an eccentric key arrangement or the like, or by hydraulic means.

In a refinement, the steerable wheel or wheel set is furnished with drive means in the region of the lowest crossbeam of the support carriage. Preferably the drive means is a hub drive means. This refinement renders the support carriage a self-propelling transport vehicle.

According to another refinement, the undercarriage of the support carriage is provided with two supplementary support wheels, preferably in the interior region of the sockets. With this arrangement the elevation of the axes of said wheels above the floor is slightly greater than the radius of said wheels. Such wheels are particularly useful if the lowest crossbeam of the column-frame of the support carriage is furnished with only a single central wheel or roller or set of wheels or rollers. In such a case, the column-frame will tend to tilt when the support carriage is negotiating a curve. The supplementary support wheels will limit the tilting.

In another refinement, the shoe on the upper end of the vertical column of the column-frame of the support carriage can be swung up around a horizontal axis, and preferaly can be fixed in the upwardly swung position. If the support carriage is used as a low-lift truck and tall loads are being handled, the shoe which extends outwardly into the load region will interfere. This interference is avoided by the said embodiment wherein the shoe can be swung upward. The shoe is prevented from falling back down in that it is fixed in the upwardly swung position.

In a preferred embodiment, the lifting, lowering, and (if present) propulsion drive means, as well as locking means, of the lifting carriage are electrically controllable. An electrical command organ is removable from its position on the lifting carriage, so that the lifting carriage can be remotely controlled (with the aid of a spiral cable or the like). When the combination of lifting carriage and support carriage is being transferred from floor level to a higher level surface, it is necessary that the operations be controllable from the lifting carriage. This means that the control organ locus would normally need to be transferred from the one level to the other during this process. In order to carry out the raising and lifting process (the said interlevel transfer process) smoothly without requiring the operation personal to move from the one level to the other, remote control capability is provided. It is not mandatory that this control involve a wire: radio remote control means may be employed.

For loading the subject floor truck onto another vehicle, it has proven advantageous to provide the support carriage with a roller system disposed between the vertical columns, which roller system has adjustable elevation. In this connection, it is also desirable to provide a loading rail, one end of which can be rested on the rollers, the other end of which is supported against the load surface of the highway truck. It is further provided that mutually parallel vertical rails are provided on the vertical columns of the support carriage, each having a plurality of spaced apart recesses. The recesses of oppositely disposed vertical rails are in pairs at equal elevations. At a given time, one of the recess pairs accepts the axle journals of the roller system. These loading rails facilitate the loading of the motorized lifting carriage onto, e.g., the highway truck. When the lifting carriage has been raised on the support carriage, the lifting carriage can then be lowered onto the said rails.

To achieve this, the combination of support carriage and lifting carriage is established near the rear end of the highway truck, and the lifting carriage is raised above the level of the load surface of the highway truck. The loading rails are pushed in from the direction of the support carriage, and the lifting carriage is lowered onto the loading rails. Using the removable drive control system, i.e., remotely operable, the motor of the lifting carriage is started. In this fashion, the lifting carriage drives onto the loading surfare of the highway truck under its own power, bringing the support carriage along with it and moving the support carriage into a position wherefrom the support carriage can be lifted on board. The frictional force required for this driving and towing maneuver by the lifting carriage is furnished by the weight of the lifting carriage itself in combination with the suspension of the highway truck. In order to be able to bridge over different heights between the resting points of the rails on the support carriage, on the one hand, and the highway truck, on the other, it is advantageous for the roller system on the support carriage to be furnished with simple means of elevation adjustment. Accordingly, the journals of the roller system can be inserted in different recesses on the vertical rails of the support carriage. The ends of these recesses have depressions into which the said journals are pressed by the forces acting on said journals, causing said journals to be securely held. By appropriate choice of the elevations of the recesses, corresponding to elevations of the load surfaces of the highway trucks to be accommodated, the elevation of the roller system, and thereby the inclination of the loading rail, can be adjusted to suit conditions.

In a preferred embodiment, the support carriage is comprised entirely or predominantly of suitable light metal alloy material. In this way the weight of the support carriage is kept low in comparison to an embodiment comprised of steel materials. Thus the support carriage is easier to lift.

The special advantages of the combination of lifting carriage and support carriage become evident in short-haul trucking. As a rule, all necessary equipment is available to the loading site. But, at the delivery site, often only low-lift trucks are available. Seldom is there a loading dock or the like for unloading at the same level as the loading surface of the highway truck.

BRIEF DESCRIPTION OF THE DRAWINGS

Many other objects and advantages of the invention will be apparent to those skilled in the art from this specification and the attached drawings wherein like reference numerals are applied to like elements.

The essence of the invention is described by the examples hereinafter, with reference to FIGS. 1–26.

Figure 21:
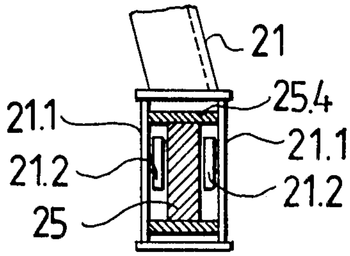
Figure 20A:
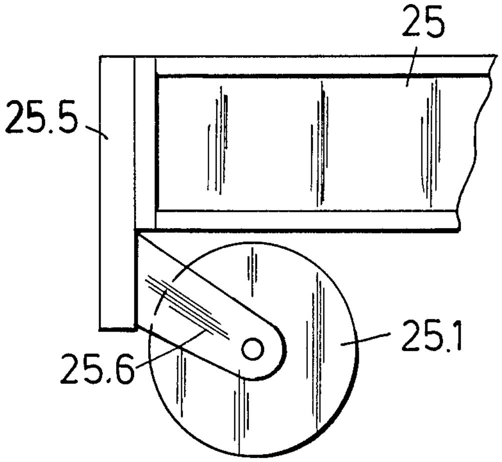
Figure 26A:
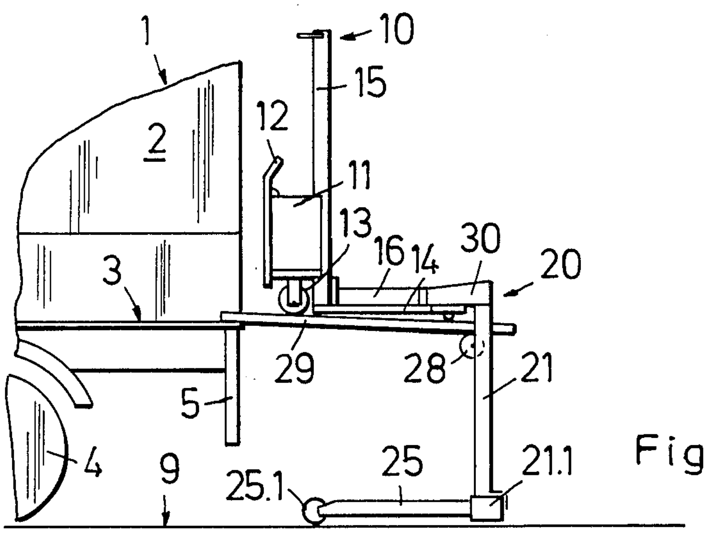
Figure 26B:
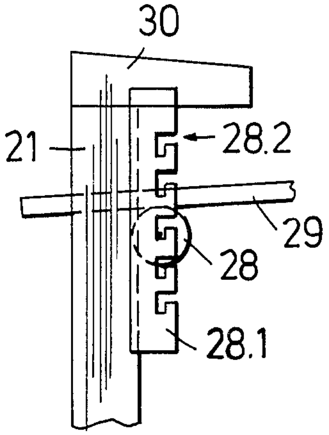
Figure 22:
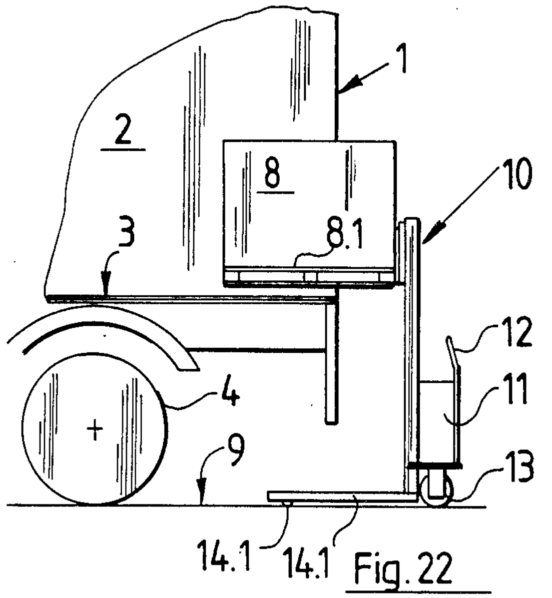
Figure 23:
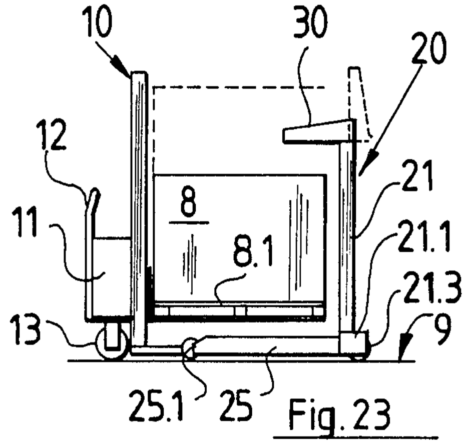
Figure 24:
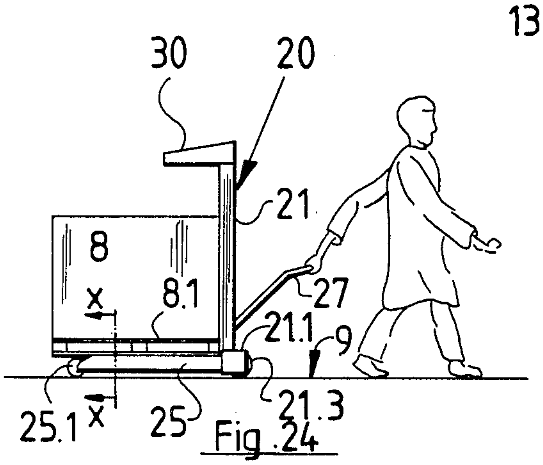
Figure 25:
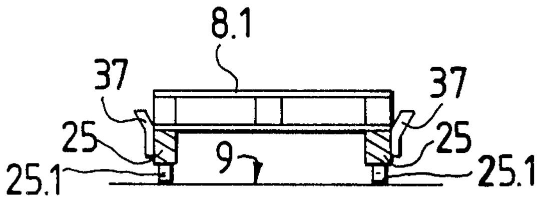

FIG. **20*a*** is the roller end of the said longitudinal beam, with backward-bent (caster-type) wheels;

FIG. 21 is a cross section through the socket with the said longitudinal beam in the loaded state and supplied with a system of rollers;

FIG. 22 is a side view of the lifting carriage being used to unload a highway truck;

FIG. 23 is a side view of a load being transferred from the lifting carriage to the support carriage;

FIG. 24 is a side view of a load being transported on the floor by means of the support carriage;

FIG. 25 is a detail showing the longitudinal beams of the support carriage with side flanges;

FIG. **26*a* shows the support carriage with the lifting carriage in a raised position and the lifting carriage being disposed on an entry rail; and FIG. 26*b*** shows vertical rails for adjusting the height of the roller means which support the horizontal loading rail.

DESCRIPTION OF THE PREFERRED EMBODIMENTS

The sequence of operations shown in FIGS. 1 to 7 is as follows: A lifting carriage 10 is raised from a floor 9 to a load surface or bed 3 in a load space 2 of a highway truck 1. Neither the highway truck 1 nor the load surface 3 thereof is equipped with special devices for accommodating the lifting carriage 10. In order to transfer the lifting carriage 10 to the load space 2 of the highway truck 1, a load flap 5 is opened. The lifting carriage includes a power supply 11 and a wagon tongue 12 and has an undercarriage comprised of a steerable roller 13 and supporting rollers 14.1 disposed at the ends of corresponding support beams 14. The lifting carriage 10 can be towed manually with the aid of the wagon tongue 12. The steerable roller (or wheel) 13 may be motor-driven.

A load accommodation means 16 is vertically movably guided in a vertical frame 15. A support carriage 20 assists in raising the lifting carriage. The support carriage 20 is comprised of vertical columns 21 and longitudinal beams 25. The vertical columns 21 are combined into a column frame by means of crossbeams. Further, steerable rollers or wheels 26 are provided under the column frame, and the end of the longitudinal beems 25 bear carriage rollers 25.1. The longitudinal beams (or struts) 25 are mounted in sleeve sockets 21.1 which are provided on the lower ends of the vertical columns 21. Shoes 30 are provided on the upper ends of the vertical beams 21.

For raising the lifting carriage, the support carriage 20 is brought into a position wherein the undercarriages of the lifting carriage 10 and the support carriage 20 mutually interpenetrate. More specifically, the supporting beams (carriage or claw beams) 14 of the lifting carriage and the longitudinal beams 25 of the support carriage, mutually interpenetrate; and the load accommodation means 16 is brought to the level of the shoes or sleeves 30. In moving the lifting carriage and the support carriage so that they interpenetrate in this fashion, the free ends of the load accommodation means 16 are guided into the shoes 30.

After this insertion, the load accommodation means 16 of the lifting carriage 10 is lowered, whereby the lifting carriage 10 is raised up from the floor 9 while being supported by the support carriage 20. At the proper height, the lifting carriage 10 is then pushed into the load space 2 of the highway truck, and via a raising of the load accommodation means 16 the lifting carriage 10 is lowered to the level of the load surface 3, whereupon the load surface 3 assumes the load. The support carriage 20 has been thus substantially relieved of its load. To completely relieve the support carriage 20 of its load, the load accommodation means 16 is further raised which lifts the support carriage 20 off the floor 9.

Figure 1:
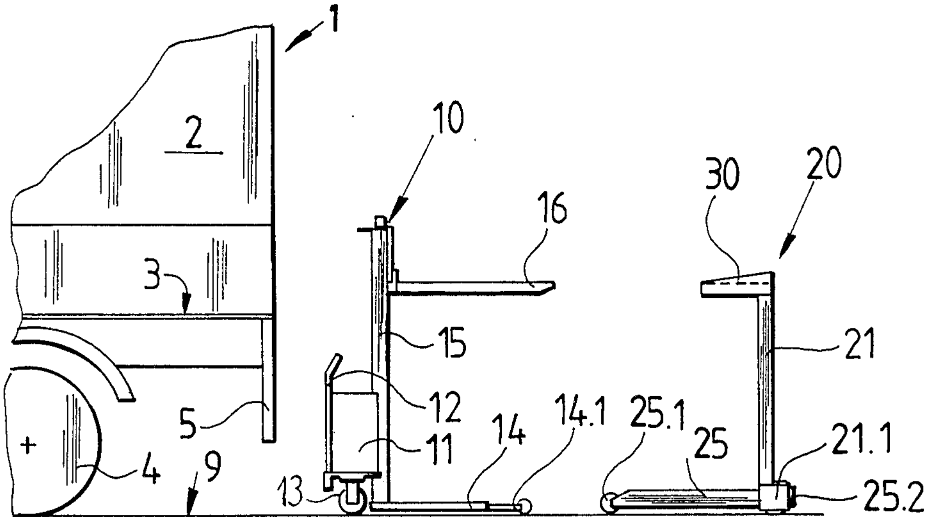
FIGS. 1 to 7 show the sequence of operations in the inventive method.
Figure 2:
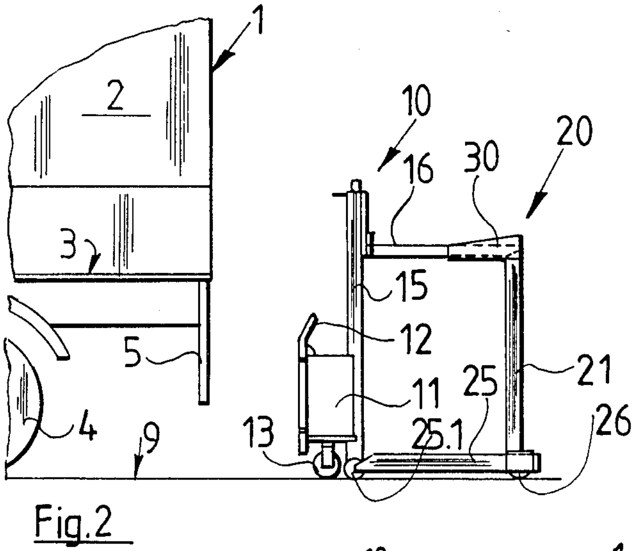
Figure 3:
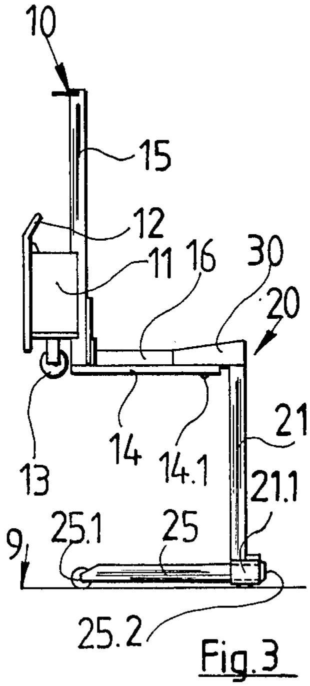
Figure 4:
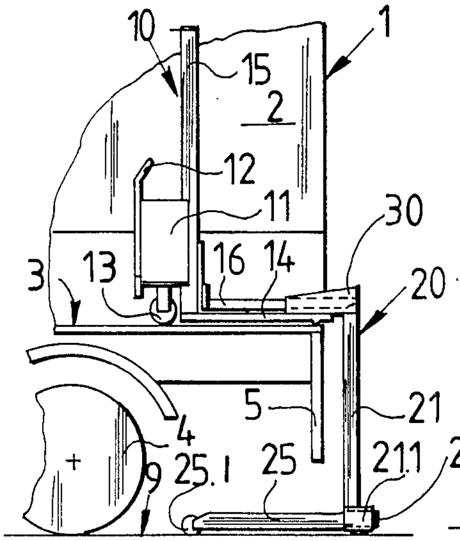
Figure 5:
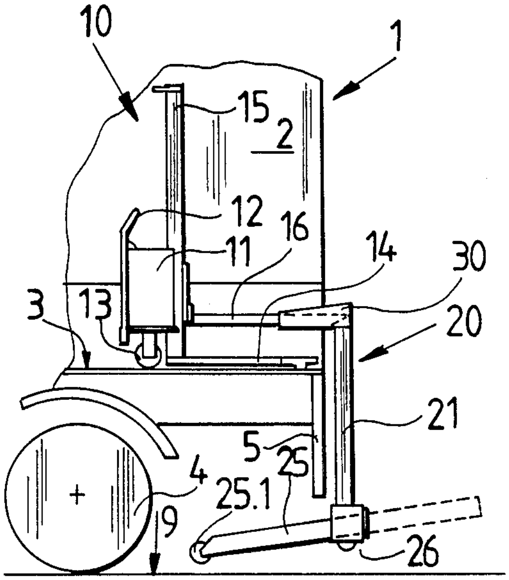
Figure 6:
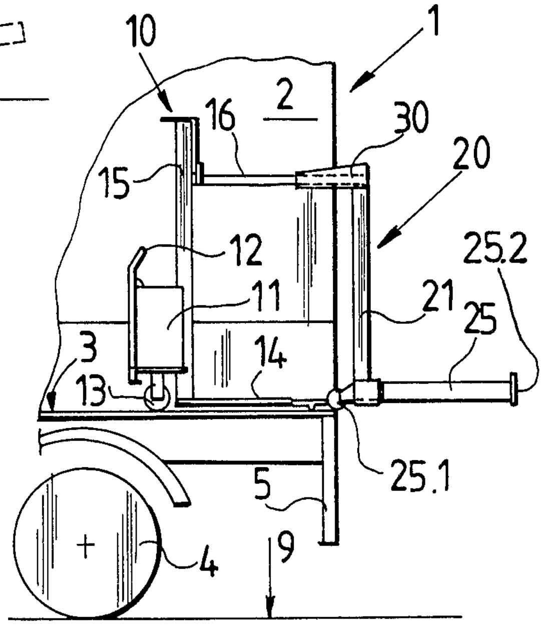
Figure 7:
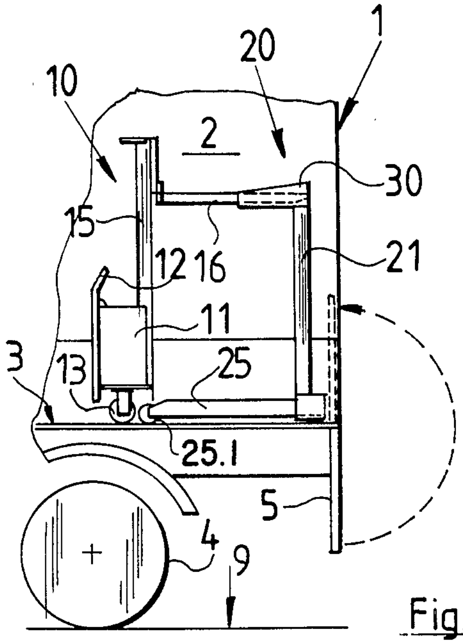

The longitudinal beams 25 are now pushed into and through the sleeve sockets 21.1 until they reach the position indicated by the dashed lines (see FIG. 5). At this point the rollers 25.1 are in a position where they can be directly moved up past the surface of the load flap 5. In the process, the support carriage 20 can be raised up until it is entirely above the level of the load level 3 of the highway truck 1. The longitudinal beams 25 are now brought back into position and the combination comprised of the lifting carriage 10 and the support carriage 20 is pushed back into the interior of the highway truck 1 until the load flap 5 can be closed. It is obvious that the same course of movement can also be carried out in the case of swingable longitudinal beams 25 with the longitudinal beams 25 swung upward.

Figures 8, 9:
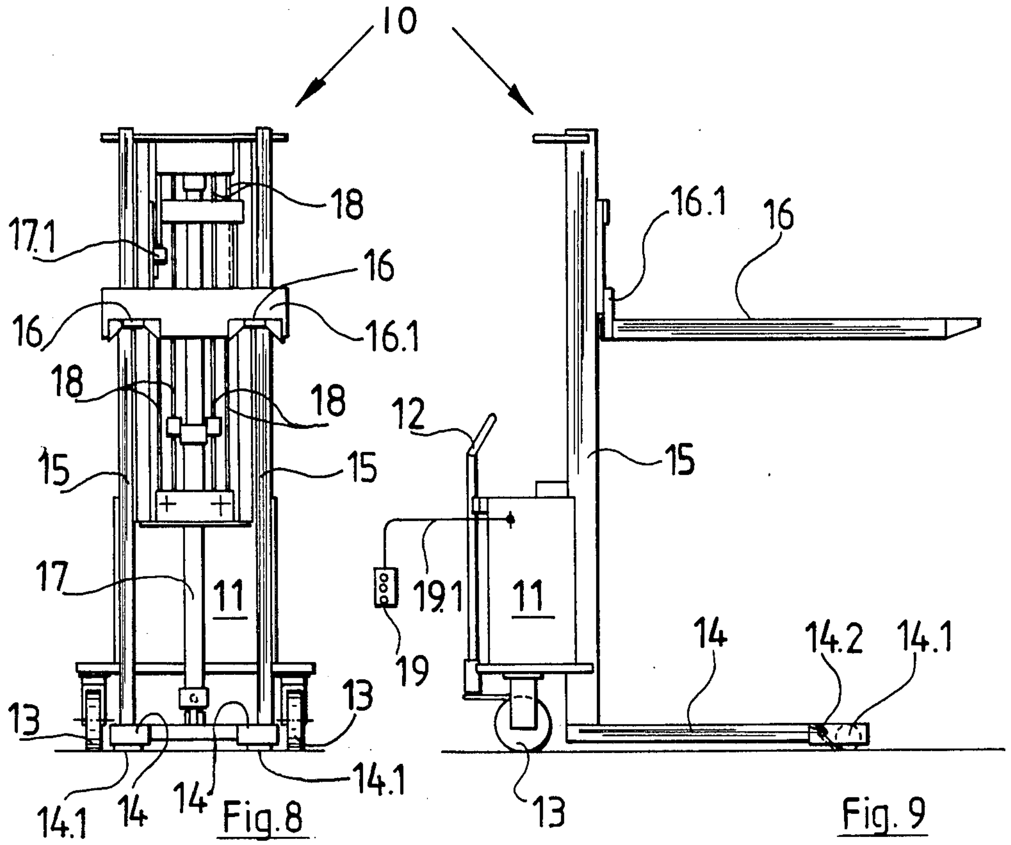
FIG. 8 is a front view of the lifting carriage.
FIG. 9 is a side view of the lifting carriage.

FIGS. 8 and 9 show the lifting carriage 10 in more detail. The vertical column-frame 15 rests on the supporting beams, i.e. carriage beams 14 which are provided on their free ends with carriage rollers 14.1. The central power unit 11, comprising enery storage means and means for producing hydraulic pressure, is disposed on column-frame 15, and is controlled by a removable control unit 19 which is connected to the central power unit 11 by a spiral cable 19.1.

The wagon tongue 12, which can be swung down, enables the lifting carriage 10 to be maneuvered along the floor manually. A dual-action hydraulic cylinder 17 is provided in the vertical column-frame 15. The cylinder 17 acts on a load-acceptance end-plate 16.1 for the load accommodation means 16, by chains 18. An end switch 17.1 limits the upward excursion of the load accommodation means 16.

Locking devices 14.2 are provided in one or both carriage beams 14. In the exemplary embodiment illustrated, these locking devices 14.2 are a locking lever swingable around an axis perpendicular to the longitudinal direction of the carriage beams 14. The lever is a certain degree longer than the distance from the said axis to the floor 9 (or to the deposit level 3). In the locking position, the lever is oriented at an angle to the horizontal, and the end face of the lever which rests on the floor 9 (or elevated deposit level 3) is inclined to correspond to this same angle. As a result, the end face rests completely against the floor (or deposit surface). When the locking lever is thus engaged, it prevents any movement in the direction of the apex of the said angle between the locking lever and the floor. Based on experience, the angle of the locking lever is chosen between 50° and 70° from the horizontal direction, and depends, among other things, on the respective materials of the contact foot and the floor.

In the inactive position, the locking lever is raised and held by a clamping device. The locking lever is released from the clamping device when desired by a tripping finger 32 (FIG. 15), whereupon it falls into the locking position.

Figure 9A:
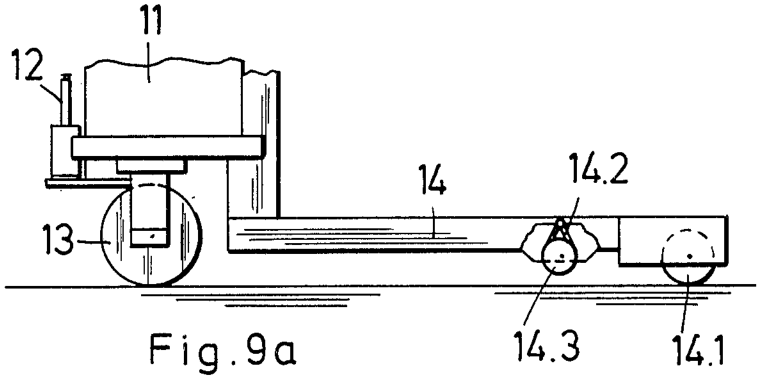
FIG. 9A is a detail of the carriage claw carriage claw beam of the lifting carriage.

FIG. 9*a* shows a detail wherein additional supporting rollers 14.3 are provided in the carriage beams 14. These additional supporting rollers 14.3 have a smaller diameter than the primary carriage rollers 14.1. Accordingly, the additional supporting rollers 14.3 are normally at a distance from the underlying surface 9. During normal running of the lifting carriage they do not touch the surface. However, when and if the lifting carriage is loaded onto a highway truck or the like it can be lowered as soon as the said supporting rollers 14.3 pass beyond the rear edge of the load surface 3. This gains additional space, and provides a simple means of carrying the support carriage past and free of contact with the load flap.

In this embodiment with additional supporting rollers 14.3, the locking device 14.2 may be disposed so as to be active on these supporting rollers as well. With the locking device so disposed, the lifting carriage, when in its preliminary (threshold) position on the elevated load surface 3, is prevented from moving in either direction. Clearly it suffices for the locking device 14.2 to be provided with a swinging locking lever which prevents movement in the direction of the rear edge, i.e., hinged edge, of the load flap (since forward movement is prevented by the overhung rear rollers). After the support carriage 20 has been lifted up over the level of the load surface 3, the lifting carriage may be rolled from its preliminary position resting on the support rollers 14.3 into its final position within the load space of the highway truck.

Figure 10:
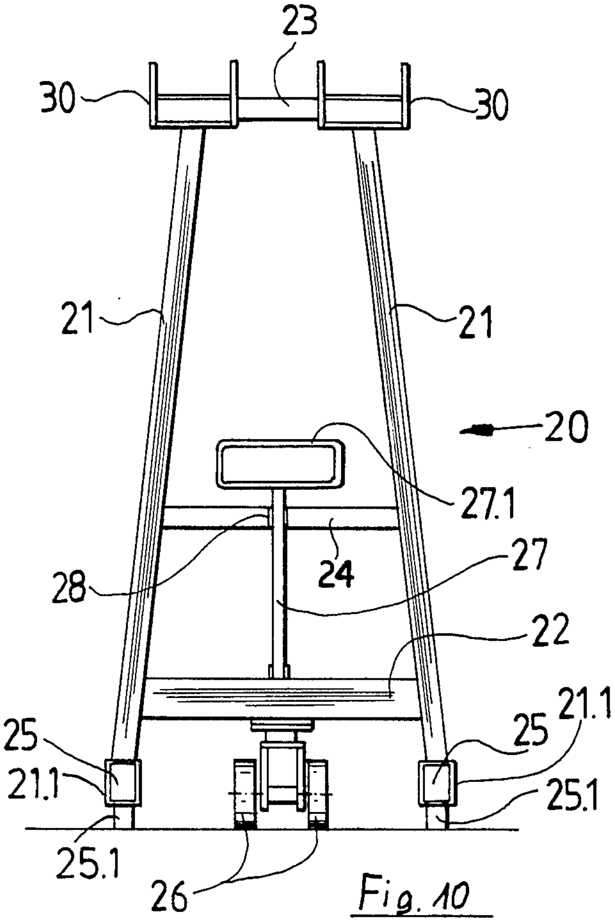
FIG. 10 is a front view of the support carriage.
Figure 11:
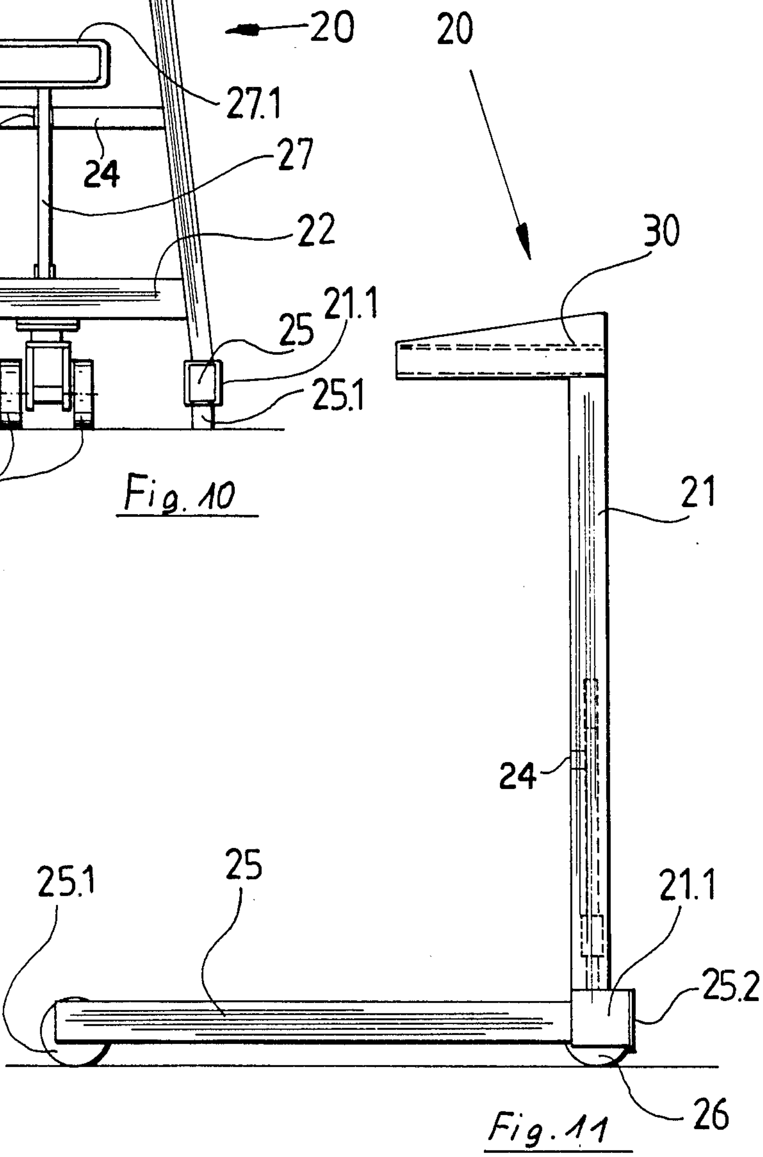
FIG. 11 is a side view of the support carriage.

FIGS. 10 and 11 show the support carriage 20 in greater detail. Its column frame includes the vertical columns 21 with a first crossbeam 22 near the lower end and a second crossbeam 23 near the upper end. A middle crossbeam 24 may also be provided. A sleeve 21.1 is provided at the lower end of each vertical beam 21. The sleeves 21.1 movably accommodate the longitudinal beams 25. Carriage rollers 26 are provided beneath the column frame including the vertical beams 21. The carriage rollers 26 may be in the form of individual rollers, or sets of rollers, or wheels. Additional carriage rollers 25.1 are disposed on the free ends of the longitudinal supports on beams 25. A wagon tongue 27 is connected to the support for the carriage wheels 26 and permits the support carriage 20 to be moved manually. The tongue 27 is swingable upward and can be locked in the upwardly swung position by a clamping fixture 28. Advantageously, the end of the wagon tongue has a hand grip 27.1.

Figure 12:
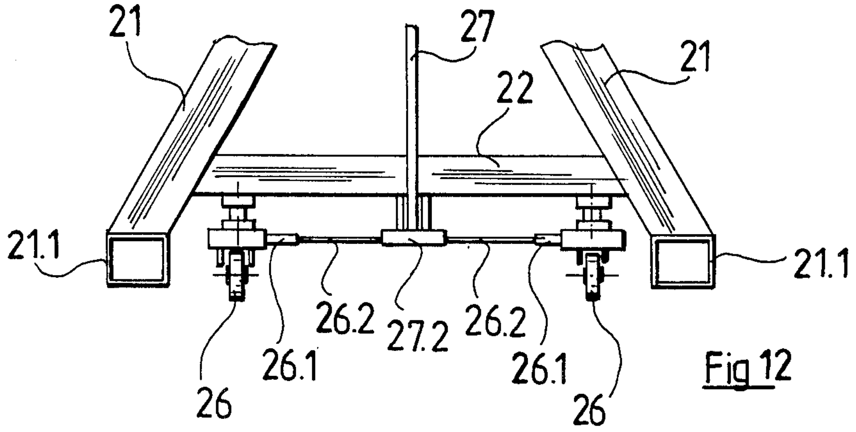
FIG. 12 is a detail of a column-type support carriage with steerable wheels.
Figure 13:
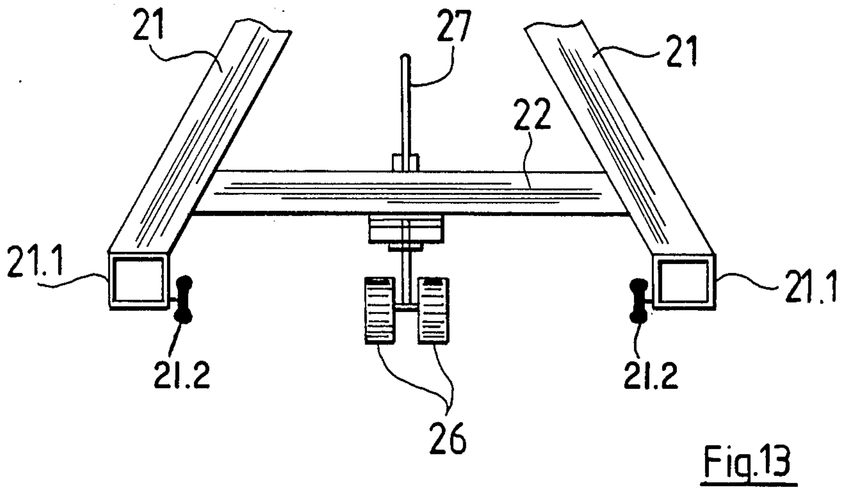
FIG. 13 is a detail of a column-type support carriage with a central set of steerable rollers.
Figure 16:
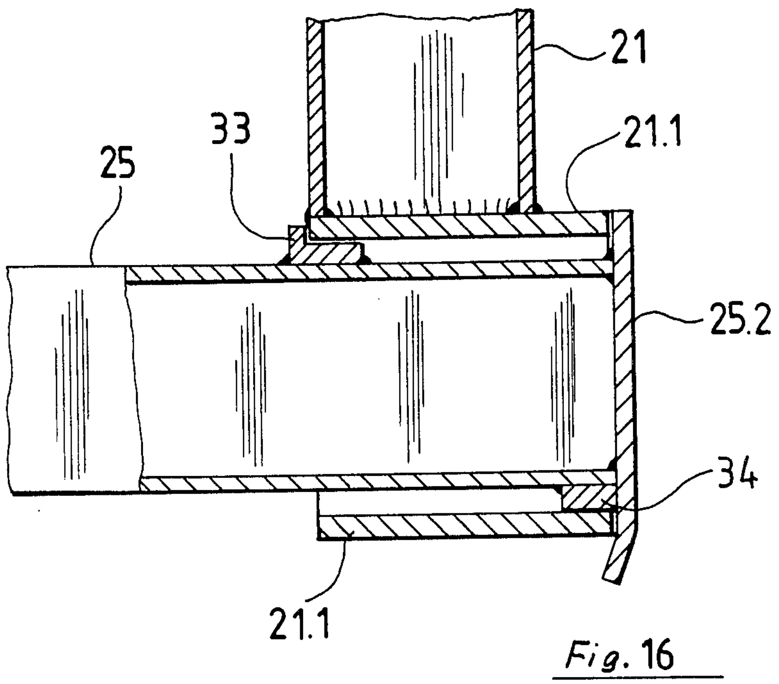
FIG. 16 is a detail of the socket or sleeve structure on the column frame.

FIGS. 12 and 13 illustrate the carriage rollers or wheels 26 provided beneath the column frame, and the steering arrangements for such rollers or wheels. The vertical beams 21 (which are shown at an exaggerated incline) bear sleeves 21.1 on their lower ends, which sleeves hold the longitudinal beams (not shown in FIGS. 12 and 13). The lowest crossbeam 22 is provided with carriage rollers 26 which are individually disposed and can be steered via link rods 26.1 and 26.2 from a steering collar 27.2, via the wagon tongue 27 which is used for towing and steering.

Another embodiment (FIG. 13) employs a steerable tandem roller 26. Obviously, the steerable tandem roller 26 might be in the form of a double caster roller. With the swiveled rollers disposed centrally, centrifugal forces can cause the column frame to tilt to the side, particularly when the support carriage is moved quickly through relatively sharp curves. This tilting is limited by support rollers 21.2, which in normal position of the support carriage 20 do not touch the underlying surface.

Figure 14:
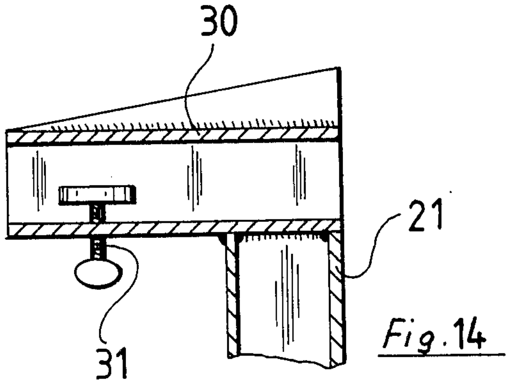
FIG. 14 is a detail of a shoe with a locking screw.
Figure 15:
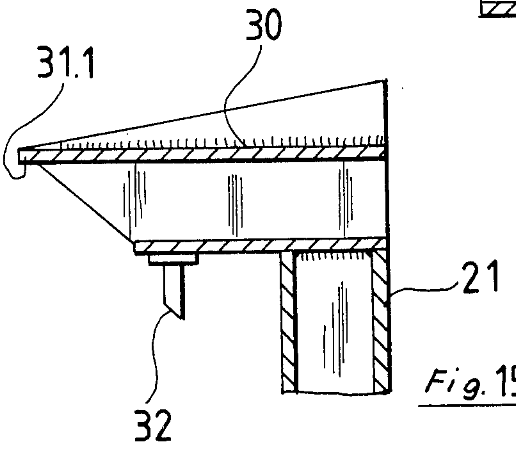
FIG. 15 is a detail of a shoe with visor-like projection and with tripping means for a brake device.

FIGS. 14 and 15 illustrate the configuration of the shoe 30 at the upper end of each of the vertical columns 21. Since the free ends of the load accommodation means 16 are inserted in the respective shoes 30 with play or tolerance, it is advantageous to fix said ends with the aid of a clamping device, e.g. a clamping screw 31. For ease of insertion it is advantageous to extend the upper member of the shoe 30 in the form of a projection 31.1 which the driver of the lifting carriage can easily see when the load accommodation means on the lifting carriage are raised and which facilitates insertion of the load accommodation means into the respective shoes 30. A tripping finger 32, which interacts with a locking device 14.2 in the region of the rollers 14.1 of the supporting and carriage beams 14 of the lifting carriage 10 (see FIG. 9), actuates this locking device when the lifting carriage is raised to the uppermost position. The lifting carriage, which is pushed, while in this raised position, into the load space 2 of the highway truck 1 and is then lowered onto the load surface 3 of the highway truck (FIGS. 1 to 7), can be set down with the locking device actuated, whereby the lifting carriage will not roll when set down. Advantageously, the locking device is configured so as to block movement of the lifting carriage only in the forward direction, i.e., toward the rear of the highway truck, whence there is no blocking of the movement of the lifting carriage in the direction opposite to this after the support carriage has been lifted and set down onto the load surface 3.

FIGS. 16 to 21 illustrate the configuration of the sockets or (sleeves) 21.1 on the lower ends of the vertical beams 21, and the interaction of these sockets with the longitudinal beams 25 which are slidably guided into these sockets 21.1. In order to prevent undesired sliding of the longitudinal beam 25 so that they pass through and become separated from the sockets, the end of each longitudinal beam 25 associated with the respective socket 21.1 is furnished with an end plate 25.2. Further, in order to prevent undesired sliding of the longitudinal beams 25 in the opposite direction, i.e., into the sockets, a stop dog 33 is provided in the region of the upper surface of the longitudinal beam 25. The dog 33 is spaced a distance away from the end plate 25 which distance corresponds to the length of the socket. Advantageously, this stop dog 33 is configured such that it extends into the interior of the socket and forms a support which works in cooperation with the support 34 disposed on the end of the longitudinal beam at a location diagonally opposite to the dog 33.

Under load, both supports rest against the walls of the socket. If the longiudinal beam 25 has no load, it "tips" or tilts downwardly in the socket (see FIG. 5), so that the stop dog 33 can be pushed through the socket 21.1.

Figure 17:
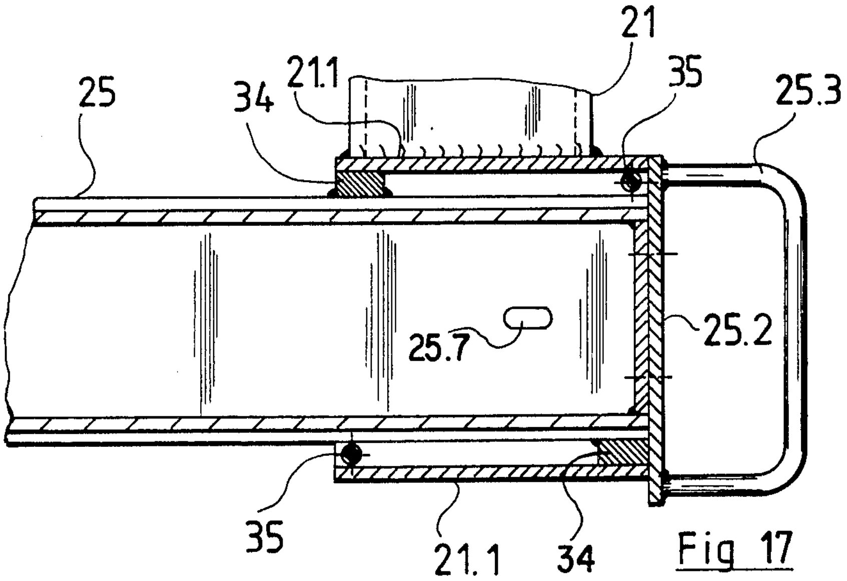
FIG. 17 is a vertical cross section of a detail of the socket or sleeve on the column frame.
Figure 18:
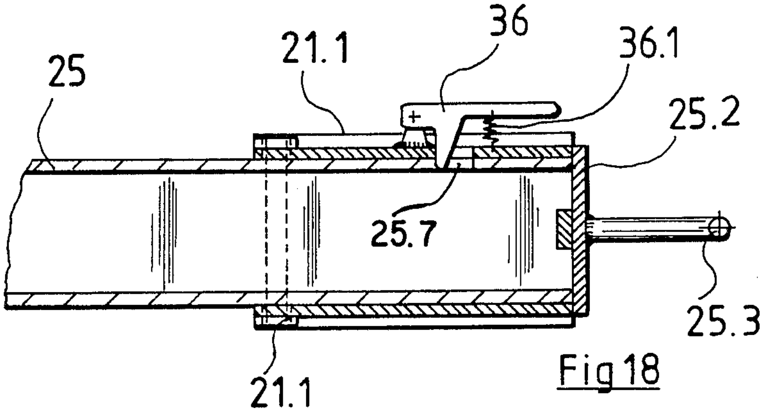
FIG. 18 is a horizontal cross section of a detail of the socket or sleeve on the column frame.

FIGS. 17 and 18 illustrate another detent configuration. Here a stopping catch 36 is provided which is retracted by a retraction spring 36.1. The stopping catch 36 penetratingly engages a recess 25.7 in the side wall of the longitudinal beam 25, via an opening in the side wall of the socket 21.1. A hand grip 25.3 on the end plate 25.2 of the longitudinal beam allows one to easily slide the beam 25 through the socket 21.1 when the beam 25 is free of load. In the loaded state, the longitudinal beam is supported against the support bearing 34 which may be welded to the socket since the longitudiial beam 25 does not need to be tipped, with this detent arrangement. Rod pieces 35, attached to the socket, facilitate sliding of the longitudinal beam 2 when the latter is in the unloaded state. Advantageously these rod pieces 35 may be rotatably mounted on the socket, and can rotate in coordination with the sliding of the longitudinal beam.

Figure 20:
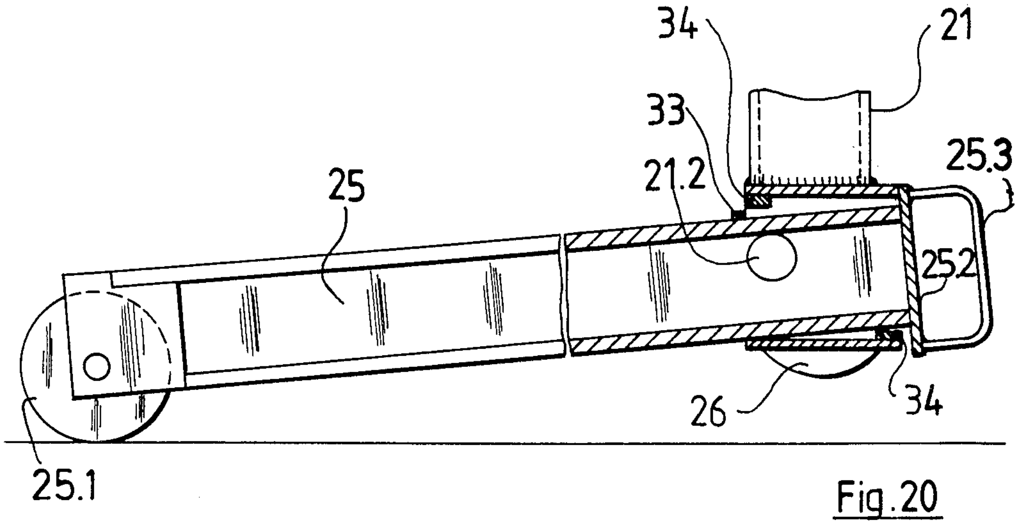
FIG. 20 is a partial cross-sectional view of the system of rollers, with the longitudinal beam in the column-frame socket in the unloaded state of said beam.
Figure 19:
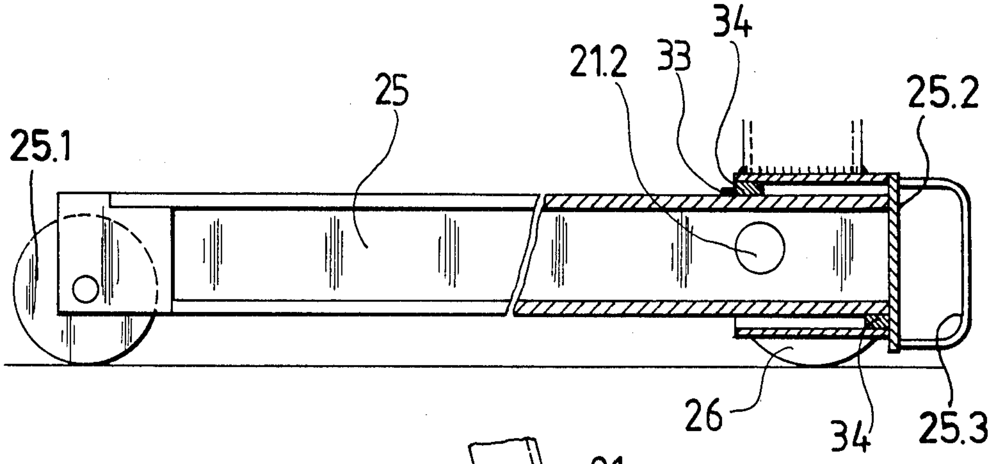
FIG. 19 is a detailed comprising a partial cross-sectional view of the system of rollers on the loaded longitudinal beam in the column-frame socket.

FIGS. 19 to 21 illustrate a third embodiment where the longitudinal beam 25 has the cross-sectional shape of an I-beam. Flanges 25.4 extend beyond the web member, at least on the upper side. In this embodiment an end plate 25.2 and detent dogs 33 are provided, along with support bearings 34 in the socket, against which bearings 34 the longitudinal beam 25 is supported when under load (FIG. 19). When the longitudiual beam is free of load (FIG. 20), the lower edges of the upper, laterally extending flanges 25.4 rest against rollers 21.2 that are provided on either side in the interior of the socket. The flanges 25.4 ride over the rollers 21.2 while the beam is being pulled by means of a hand grip 25.3.

FIG. *20a* shows the same situation, but with a roller 25.1 shifted in the rearward direction. A rearwardly inclined arm 25.6, bearing the roller 25.1, is attached to an end plate 25.5 of the longitudinal beam 25.

FIG. 22 illustrates the situation where a lifting carriage 10 has picked up a load 8 on a pallet 8.1 from the load surface 3 of the highway truck 1, with the load accommodation means 16. The lifting carriage 10 is now removing the load from the load space 2 of the highway truck. The other reference numerals correspond to those of FIGS. 1 to 9. The load which has been picked up is lowered, and in FIG. 23 is being transferred to the support carriage 20. In this it is essential that the load accommodation means 16 of the lifting carriage 10 be lowered to a point below the upper edge of the longitudinal beams 25 of the support carriage, whereby the longitudinal beams 25 will assume the load 8 which rests on pallet 8.1.

The support carriage 20 may now be used as an ordinary horizontal motorized floor truck for transport over a level surface This transport is generally easier than that with a lift truck of the familiar type, due to the structural features such as larger diameter wheels or rollers since it is not necessary to drive under the pallets, and due to elimination of the need for massive and tall vertical frames and drives.

It is quite evident that the reverse movements of the load can be carried out in the reverse sequence, i.e. transport by the support carriage 20 at floor level to the highway truck, transfer of the pallet with the load to the lifting carriage 10, and from the lifting carriage 10 to the highway truck 1. In order to be able to set down the pallet 8.1 in proper position on the longitudinal beams 25 of the support carriage 10, (as seen in FIG. 25 which is a cross section through line X—X of FIG. 24) upwardly and outwardly divergent projecting members 37 are provided on the exterior sides of the longitudinal beams 25, whereby an upward and outwardly opening configuration is provided. If a load, i.e., pallet, is set down in a position which is shifted from the correct position, the pallet 8.1 is guided into the correct position by these projecting members 37 and held in place during transport.

Finally, FIGS. *26a* and *26b* illustrate the loading onto a highway truck or unloading from a highway truck of a combination of a lifting carriage 10 and a support carriage 20, with the aid of an entry rail 29. The lifting carriage 10 has been lifted by lowering its load accommodation means 16 which were supported in the sockets 30 of the support carriage 20. Said lifting carriage is presently raised above the level of the load platform 3 of the highway truck 1. The entry rail 29, which is used as an aid in loading, is pushed while riding on the roller(s) 28 mounted between the vertical beams 21 of the support carriage 20 by means of bars 28.1, each of which is provided with several recesses 28.2, spaced from one another until a position is reached where one end of said rail 29 is supported on the roller system 28 and the other on the load surface 3 of the highway truck 1.

The load accommodation means 16 of the lifting carriage 10 is raised until the drive roller (which is also the steering roller) 13 of the lifting carriage 10 is supported on the entry rail 29. Control of the load accommodation means 16 is by the drive 11 with the aid of a control unit (not shown in FIGS. *26a* and *26b*, but seen in unit 19, FIG. 9) which is connected by a cable to the power unit 11. At this point the drive mechanism for the rollers 13 can be started. The rollers 13 then frictionally engage the entry rail 29 and can exert sufficient force on it to propel the lifting carriage 10 onto the platform of the highway truck. The support carriage 20 is carried along in the process, while the rail 29 rides over the roller system 28 and remains at rest with respect to the highway truck 1. The force exerted by the lifting carriage 10 on the rail is transferred exclusively by the drive roller(s) 13. The support rollers of the longitudinal beams 14 do not even contact the rail 29. The force exerted is taken up for the most part by the highway truck and its suspension. Accordingly, the support carriage 20 can follow the movement of the lifting carriage 10 when the lifting carriage is being driven into the highway truck, and can bring itself into the position where it can be lifted onto the highway truck itself, as described above.

It should now be apparent that a novel method and apparatus for loading and unloading a truck or other elevated surface has been described. Moreover, it will be apparent to those skilled in the art that numerous modifications, variations, substitutions and equivalents exist for various features of the invention. Accordingly, it is expressly intended that all such modifications, variations, substitutions and equivalents which fall within the spirit and scope of the appended claims be embraced thereby.

What is claimed is:

1. A method for handling a motorized floor truck comprised of a lifting carriage and a support carriage, said lifting and support carriages being mutually independently operable as vehicles, the lifting carriage including load accommodation means which is raisable and lowerable, wherein by operating said carriages cooperatively one can effect alternate raising to a deposit level which is higher than a floor level, and wherein an undercarriage can be driven into position underneath at least an end region of said deposit level; the method comprising the following sequence of operating steps:

raising a load accommodation means of a lifting carriage, and coupling the raised load accommodation means with a support carriage.

lowering the load accommodation means of the lifting carriage which is now coupled with the support carriage, whereby in the process the lifting carriage is lifted to a position above the deposit level;

moving the support carriage along with the lifted lifting carriage until a deposit position is reached;

raising the lowered load accommodation means of the lifting carriage, which load accommodation means is coupled to the support carriage, whereby in the process of such raising the support carriage is lifted;

shifting the position of an undercarriage of the support carriage, and then, after the support carriage has been lifted to an elevation above the deposit level, restoring the position of said undercarriage;

depositing the support carriage onto the deposit surface, by lowering the load accommodation means of the lifting carriage; and moving the combination of lifting carriage and support carriage, which combination has been deposited on the deposit surface, to the desired final postion, and fixing at least the lifting carriage in place, to prevent further movement.

2. A motorized floor truck operable to raise itself to another level, comprising:

a lifting carriage including a vertical frame having a load accommodation means with an outer width, the load accommodation means being guided in the vertical frame and operable through a vertical excursion, drive means for raising and lowering the load accommodation means; and a support carriage including an undercarriage with longitudinal beams, each beam having one end connected to a first crossbeam and a free end, the longitudinal beams forming a fork having a width between the inner sides of the longitudinal beams at least equal to the outer width of the load accommodation means;

a column-frame disposed generally perpendicular to the undercarriage and including a pair of vertical columns having lower ends and upper ends, the lower ends of the vertical columns being connected to the longitudinal beams, the vertical colummns being connected by a second crossbeam near the upper ends, the height of the vertical columns of the the support carriage being essentially the same as the height of the lifting excursion of the load accommodation means which are guided in a vertical frame of the lifting carriage;

means for accepting the load accommodation means being provided at the upper ends of the vertical columns;

a first rolling support being provided on the free end of each longitudinal beam; and a second rolling support being provided on the first crossbeam.

3. A motorized floor truck according to claim 2 further including sleeves provided on the column-frame of the support carriage in the region of the lower ends of the vertical columns thereof, the longitudinal beams of the undercarriage of the support carriage being slidably held by the sleeves, the cross-sectional shape and cross sectional surface of each such sleeve corresponds to the exterior shape of the associated longitudinal beam and accepts said longitudinal beam with a certain amount of play that permits fixing by means of clamping, and wherein the ends of the longitudinal beams associated with the sleeves include end detents in the form of end plates.

4. A motorized floor truck according to claim 3 wherein the sleeves slidably accepting the longitudinal beams of the undercarriage of the support carriage are provided with a detent which limits or prevents sliding of the longitudinal beams, said detent preferably being in the form of stop dogs which cooperate with the edge of the sleeve, wherein the height of the stop dogs is selected such that when the load is removed from the longitudinal beam as the support carriage is lifted, the longitudinal beam tips in consequence of its play, and the stop dogs are now disposed under the edge of the sleeve whereby they no longer block the sliding movement.

5. A motorized floor truck according to claim 3 wherein the detents which prevent sliding of the longitudinal beams are in the form of spring-loaded stopping catches which engage recesses or openings in the longitudinal beams and which can be lifted out of such openings by means of levers which are manually actuated.

6. A motorized floor truck arrording to claim 3 wherein a roller is provided in the interior of each sleeve near the inner wall of the upper member of the sleeve, which roller is positioned in the region of the sleeve in which the longitudinal beam swings down toward the lower member of the sleeve when the load is removed from, and wherein the cross-sectional shape of the longitudinal beam includes projecting flanges on at least the upper side of said beam.

7. A motorized floor truck according to claim 2 wherein the longitudinal beams of the undercarriage of the support carriage are swingable around a horizontal axis.

8. A motorized floor truck according to claim 2 wherein the first rolling support is attached to the ends of the longitudinal beam of the support carriage by backwardly bent arms.

9. A motorized floor truck according to claim 2 wherein the means on the support carriage for receiving the load accommodation means of the lifting carriage is in the form of a shoe into which the load accommodation means is inserted, wherein the cross-sectional shape of said shoe corresponds to the external shape of the load accommodation means, and the shoe accepts the forward end of the load accommodation means in essentially form-locking fashion.

10. A motorized floor truck according to claim 9 wherein the upper member of the shoe is provided with a visor-like projection which extends in the direction opposite to the direction in which the load accommodation means is inserted into the shoe.

11. A motorized floor truck according to claim 9 wherein the shoe is provided with a screw-type clamping device fo fixing the forward end of the load accommodation means of the lifting carriage when the forward end is inserted in the shoe on the column-frame of the support carriage.

12. A motorized floor truck according to claim 9 wherein the shoe on the column-frame of the support carriage is symmetrical in the direction of insertion so that the load accommodation means of the lifting carriage is insertable into the symmetric shoe from either direction.

13. A motorized floor truck according to claim 2 wherein the means on the support carriage for engaging the support carriage with the load accommodation means of the lifting carriage includes a tripping finger, and wherein the longitudinal beams of the lifting carriage are provided with a locking device which can be actuated when raised, said actuation being by interaction with the tripping finger, so that, when the lifting carriage is then lowered again and deposited on the underlying surface, said locking device prevents said lifting carriage from moving in some movement direction.

14. A motorized floor truck according to claim 2 wherein the second rolling support on the lowest crossbeam of the column-frame of the support carriage is steerable.

15. A motorized floor truck according to claim 14 wherein the steerable rolling support on the lowest crossbeam of the column-frame on the support carriage is centrally disposed, and is attached to the lowest crossbeam by means of backwardly extending arms.

16. A motorized floor truck according to claim 14 wherein the steerable rolling support is in the form of individual rollers which are attached to the lowest crossbeam by means of backwardly extending arms which are a distance apart and are equidistant from the central axial plane.

17. A motorized floor truck according to claim 14 wherein an upwardly swingable steering bar is connected to a center trunnion of the steerable rolling support, wherein a support member is provided in another crossbeam of the column-frame of the support carriage, for clamping accommodation of the steering bar when the latter is in the swung-up position.

18. A motorized floor truck according to claim 2 wherein the lifting carriage is in the form of a fork lift truck of a type which is supported by supporting beams under the load accommodation means, wherein the load accommodation means extends a certain distance beyond the supporting beams, which certain distance is at least equal to the diameter of the wheels plus the cross-sectional thickness of the vertical columns of the column-frame of the support carriage.

19. A motorized floor truck according to claim 2 wherein the elevation of the upper edge of the longitudinal beams of the undercarriage of the support carriage is at maximum equal to the lifting elevation of known low-lift lift trucks.

20. A motorized floor truck according to claim 18 wherein additional support rollers are provided on the said supporting beams of the lifting carriage, in addition to the end-disposed rollers and at a distance therefrom, whereby when the end-disposed rollers are supported on the underlying surface, such that there is a small clearance between said additional rollers and said surface.

21. A motorized floor truck according to claim 20 wherein the additional support rollers are provided with locking means.

22. A motorized floor truck according to claim 2 wherein the load accommodation means of the lifting carriage is preferably in the form of a pair of forwardly directed and forwardly telescoping extensible profiles.

23. A motorized floor truck according to claim 2 wherein the profiles of the longitudinal beams of the undercarriage of the support carriage are provided, preferably on their outer edges, with outwardly and upwardly projecting flange-like members which preferably are disposed in the regions of the rear and forward ends of the longitudinal beams.

24. A motorized floor truck according to claim 23 wherein the end surfaces of the upwardly projecting flange-like members interact as stop dogs with the upper members of the sleeves of the column-frame of the support carriage, wherein the height of the upwardly projecting members on the longitudinal beam is at most equal to the interior free height of the sleeve of the column-frame.

25. A motorized floor truck according to claim 23 wherein the upwardly projecting flange-like members are oriented so as to open outward at an angle.

26. A motorized floor truck according to claim 2 wherein the longitudinal beams of the undercarriage of the support carriage have adjustable elevation, by hydraulic elevation-adjusting means which are hand-pump operated.

27. A motorized floor truck according to claim 2 wherein the steerable rolling support in the region of the lowest crossbeam of the support carriage is provided with drive means.

28. A motorized floor truck according to claim 2 wherein the undercarriage of the support carriage is provided with two additional support wheels, preferably in the interior region of the sleeves, whereby the distance from the axis of said wheels to the underlying surface is greater than the radius of the wheels.

29. A motorized floor truck according to claim 2 wherein the shoe on the upper end of the vertical column of the column-frame of the support carriage is upwardly swingable around a horizontal axis, and can be fixed in the upwardly-swung position.

30. A motorized floor truck according to claim 2 wherein the lifting, lowering, and propulsion drive means, as well as locking means, of the lifting carriage are electrically controllable, with an electrical command control removable from a position on the lifting carriage, so that the lifting carriage can be remotely controlled.

31. A motorized floor truck according to claim 2 wherein the support carriage is provided with a roller system disposed between the two vertical columns, the elevation of which roller system being adjustable; and wherein a loading rail is provided, one end of which can be supported on the roller system and the other end of which can be supported against the load surface of the highway truck.

32. A motorized floor truck according to claim 31; characterized in that vertical rails are provided on the vertical columns of the support carriage, said rails running mutually parallel and each having a plurality of spaced apart recesses, whereby the recesses of oppositely disposed vertical rails are in pairs at equal elevations, one of which pairs accepts the axle journal of the roller system.

33. A motorized floor truck according to claim 2 wherein the support carriage is comprised primarily of suitable light metal alloy material.

* * * * *